P. J. MANGAN.
Side-Bar Vehicle.
No. 212,024. Patented Feb. 4, 1879.
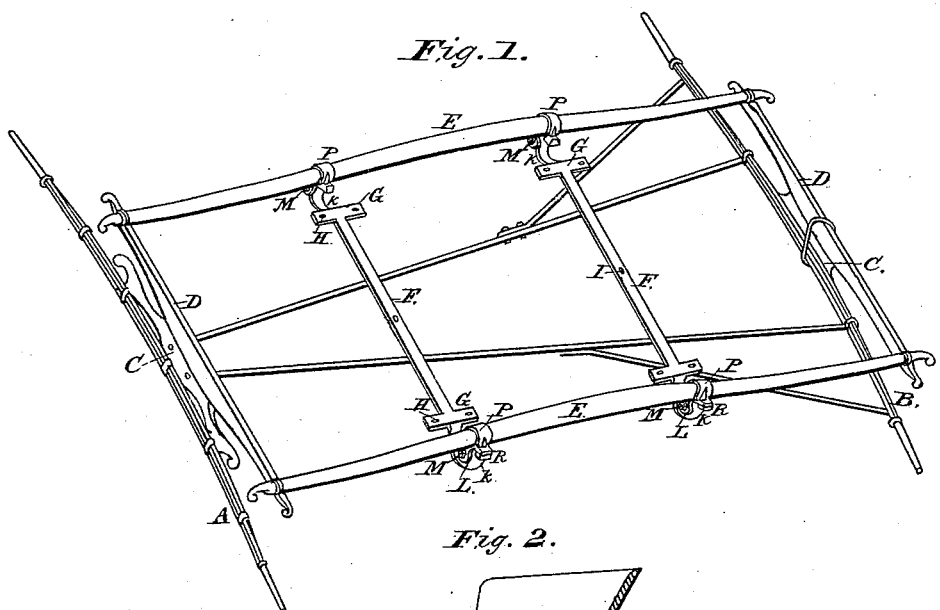
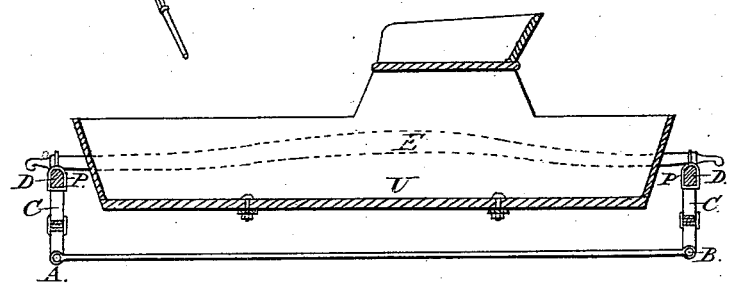
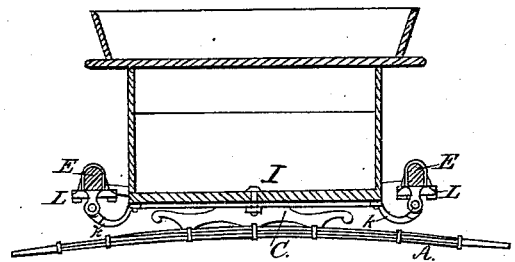 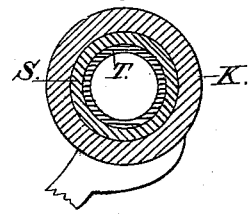
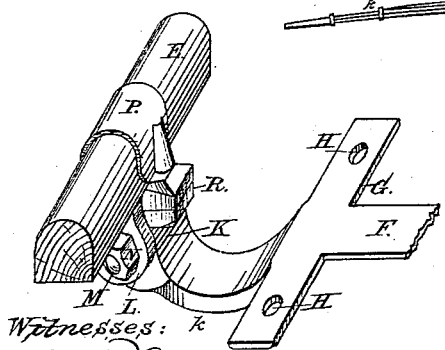 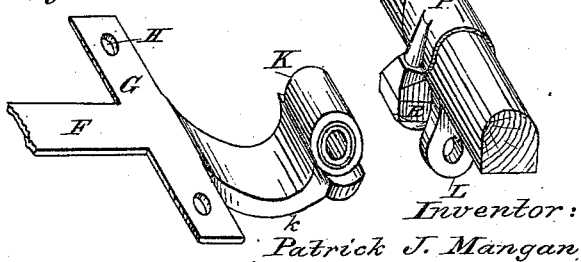
Witnesses:
Inventor:
Patrick J. Mangan
By James L. Norris.
Attorney.

UNITED STATES PATENT OFFICE.

PATRICK J. MANGAN, OF NEW YORK, N. Y.

IMPROVEMENT IN SIDE-BAR VEHICLES.

Specification forming part of Letters Patent No. 212,024, dated February 4, 1879; application filed November 15, 1878.

*To all whom it may concern:*

Be it known that I, PATRICK J. MANGAN, of New York, in the county of New York and State of New York, have invented certain new and useful Improvements in Spring Side Bar Couplings for Road-Wagons and other Vehicles, of which the following is a specification:

This invention relates to certain improvements in couplings for spring side-bar road-wagons or vehicles; and it has for its object to simplify the construction of such vehicles, to provide a low-down body, by means of which the strain upon the side bars is materially lessened, and great freedom of motion is secured, to obviate the disagreeable noise so common to this class of vehicles as ordinarily constructed, to prevent the twisting of the side bars consequent upon the strain brought to bear upon the same by the ordinary rigidly-connected shackles, and to give the vehicle a neater and more stylish finish than heretofore, and securing the utmost elasticity to the supports of the wagon-body.

To this end my invention consists in the combination, with the body and side bars of a side-bar vehicle, of transverse continuous body-supporting arms having at their ends lateral ears provided with bolt-holes, said bars having also downward-curved ends terminating in bolt-eyes, and shackles for receiving said eyes supported directly under the side bars by clips embracing said bars, whereby the body is hung low and its weight is suspended directly under the side bars, which are relieved of all torsional strain.

In the drawings, Figure 1 represents a perspective view of the truck of the vehicle, the wheels and body of which are omitted. Fig. 2 represents a longitudinal section of the truck and body with the wheels omitted. Fig. 3 represents a transverse vertical section of the same, and Fig. 4 a detached sectional view of one of the side bars and connecting-shackle. Fig. 5 is a transverse section of the eye of the cross-bar, showing its bushing.

The letters A and B represent the front and rear axle-trees, and C the bolsters, to which the transverse springs D are secured.

The letter E represents the spring side bars connected to the springs D at each end. These may all be of the ordinary or any approved construction. The letter F represents the cross-bars upon which the body of the wagon is mounted. These extend across the truck, and are provided near each end with transverse projections or ears G, in which are formed apertures H, through which the bolts necessary to secure the body of the wagon to said bars may be passed. The bars are welded at their centers, and each has a bolt-hole, through which passes a bolt, I, by means of which the wagon-body may be secured at such point. These bars, at each end, are curved downward, as at $k$, and provided with an eye, K, which sets in a bifurcated clip or shackle, L, and is confined therein by means of a bolt or pivot, M, extending through the clip or shackle, and fastened therein by a nut, N. The clip or shackle is secured to the side bar by means of a strap, P, the ends of which pass through apertures in said clip or shackle, and are provided with confining-nuts R.

The eyes of the transverse bars should be bushed or lined with leather, felt, rubber, or other suitable material, S, within which may be set an auxiliary bushing or lining, T, of brass or other soft metal, by means of which a yielding bearing is secured, whereby the disagreeable rattling noise common to this class of vehicles as ordinarily constructed is materially lessened, if not wholly obviated.

The transverse bars are made quite light, of suitable iron, such as Norway iron, and on each side, by means of the lugs or ears, are bolted to the rockers of the wagon-body U, being bolted at the center directly to the said wagon-body. By reason of their lightness the bars possess considerable spring and elasticity, which materially contributes to the riding qualities of the vehicle.

The pivoted connection at the shackle or clip prevents all twisting of the side bars consequent upon the rise and fall of the body, thus relieving said side bars of all strain, and obviating the liability of breakage, which is one of the most serious objections to the ordinary rigid connections, and, besides, it affords a neater and more stylish finish to the vehicle.

The bushing of the eyes of the bars deadens the noise common to this class of vehicles, and the whole forms a simpler, neater, and more perfectly operating wagon than has heretofore been constructed.

By reason of the curved ends of the transverse supporting-bars, the body of the wagon sets down between or about on a level with the spring side bars, whereby greater freedom or both lateral and vertical oscillation of the wagon-body is secured, adding greatly to the luxury of the movements of said body.

By obviating the torsional strain upon the spring side bars, the said bars may be made much lighter than as ordinarily constructed, thus adding to the grace and running qualities of the wagon, and by varying the size of the curve at the ends of the transverse bars the wagon-body can be set at any desired height.

What I claim, and desire to secure by Letters Patent, is—

The combination, with the body and side bars of a side-bar vehicle, of the transverse body-supporting bars E, having the ears G, provided with bolt-holes, said bars having also the downward-curved ends $k$, terminating in bolt-eyes, and the shackles L, supported by clips P, which embrace the side bars, substantially as described, whereby the body is hung low and its weight is suspended directly under the side bars, and torsional strain upon said bars obviated.

In testimony that I claim the foregoing I have hereunto set my hand in the presence of the subscribing witnesses.

PATRICK J. MANGAN.

Witnesses:
WM. E. BARRY,
GEO. W. BOYLE.